United States Patent
Biran et al.

(10) Patent No.: US 7,620,749 B2
(45) Date of Patent: Nov. 17, 2009

(54) DESCRIPTOR PREFETCH MECHANISM FOR HIGH LATENCY AND OUT OF ORDER DMA DEVICE

(75) Inventors: Giora Biran, Zichron-Yaakov (IL); Luis E. De la Torre, Austin, TX (US); Bernard C. Drerup, Austin, TX (US); Jyoti Gupta, Austin, TX (US); Richard Nicholas, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 11/621,789

(22) Filed: Jan. 10, 2007

(65) Prior Publication Data

US 2008/0168259 A1    Jul. 10, 2008

(51) Int. Cl.
*G06F 13/28* (2006.01)
(52) U.S. Cl. .................. 710/22; 712/207
(58) Field of Classification Search .......... 710/22; 712/207, 237
See application file for complete search history.

(56) References Cited

U.S. PATENT DOCUMENTS

| | | | |
|---|---|---|---|
| 6,848,029 B2 * | 1/2005 | Coldewey | 711/137 |
| 6,981,074 B2 * | 12/2005 | Oner et al. | 710/32 |
| 7,076,578 B2 * | 7/2006 | Poisner et al. | 710/52 |
| 7,218,566 B1 * | 5/2007 | Totolos et al. | 365/222 |
| 2003/0172208 A1 | 9/2003 | Fidler | |
| 2004/0034718 A1 * | 2/2004 | Goldenberg et al. | 709/250 |
| 2004/0187122 A1 | 9/2004 | Gosalia et al. | |
| 2005/0027902 A1 | 2/2005 | King et al. | |
| 2005/0108446 A1 | 5/2005 | Inogai | |
| 2006/0206635 A1 * | 9/2006 | Alexander et al. | 710/22 |
| 2007/0073915 A1 * | 3/2007 | Go et al. | 710/11 |
| 2007/0074091 A1 * | 3/2007 | Go et al. | 714/752 |

(Continued)

FOREIGN PATENT DOCUMENTS

CN    1794214 A    6/2006

(Continued)

OTHER PUBLICATIONS

U.S. Appl. Ser. No. 11/532,562, filed Sep. 18, 2006, Biran et al.

(Continued)

*Primary Examiner*—Alford W Kindred
*Assistant Examiner*—Ernest Unelus
(74) *Attorney, Agent, or Firm*—Stephen R. Tkacs; Stephen J. Walker, Jr.; Matthew B. Talpis

(57) ABSTRACT

A DMA device prefetches descriptors into a descriptor prefetch buffer. The size of descriptor prefetch buffer holds an appropriate number of descriptors for a given latency environment. To support a linked list of descriptors, the DMA engine prefetches descriptors based on the assumption that they are sequential in memory and discards any descriptors that are found to violate this assumption. The DMA engine seeks to keep the descriptor prefetch buffer full by requesting multiple descriptors per transaction whenever possible. The bus engine fetches these descriptors from system memory and writes them to the prefetch buffer. The DMA engine may also use an aggressive prefetch where the bus engine requests the maximum number of descriptors that the buffer will support whenever there is any space in the descriptor prefetch buffer. The DMA device discards any remaining descriptors that cannot be stored.

11 Claims, 4 Drawing Sheets

U.S. PATENT DOCUMENTS

2007/0079185 A1* 4/2007 Totolos ................. 714/718
2007/0162652 A1* 7/2007 Go et al. ................. 710/22
2007/0204091 A1  8/2007 Hofmann et al.

OTHER PUBLICATIONS

U.S. Appl. Ser. No. 11/621,776, filed Jan. 10, 2007, Biran et al.

* cited by examiner

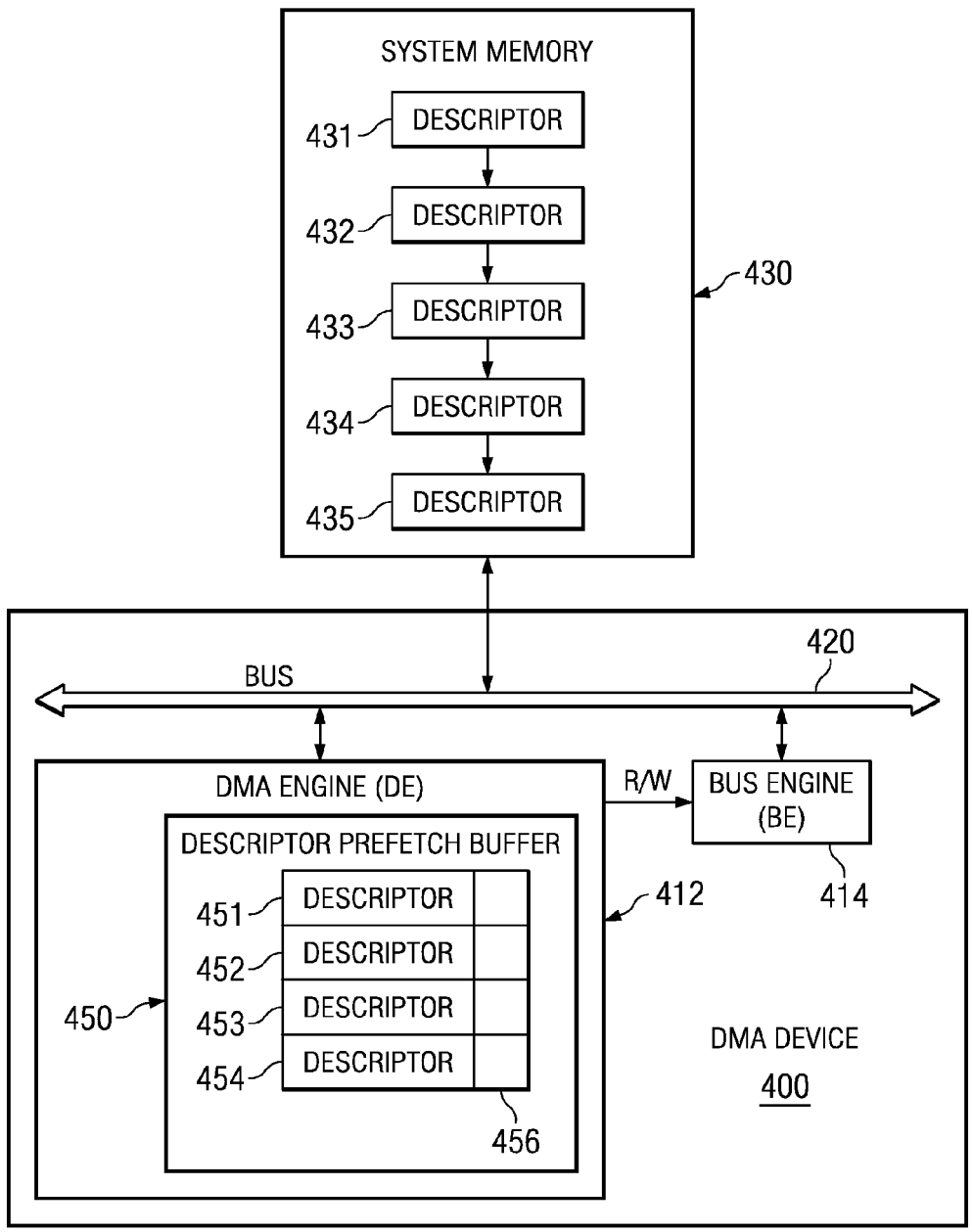

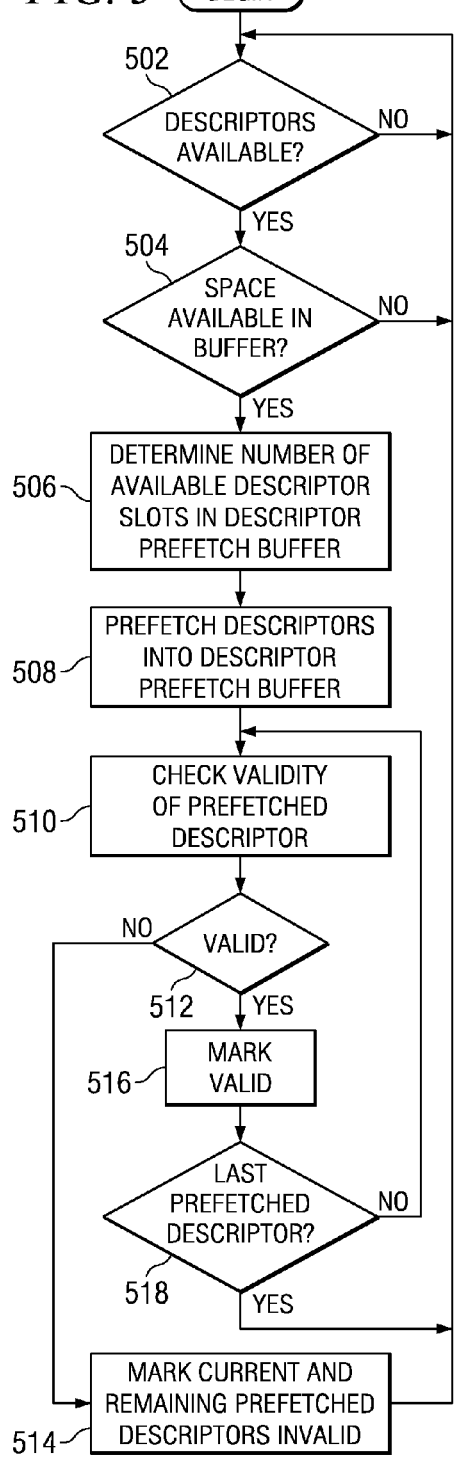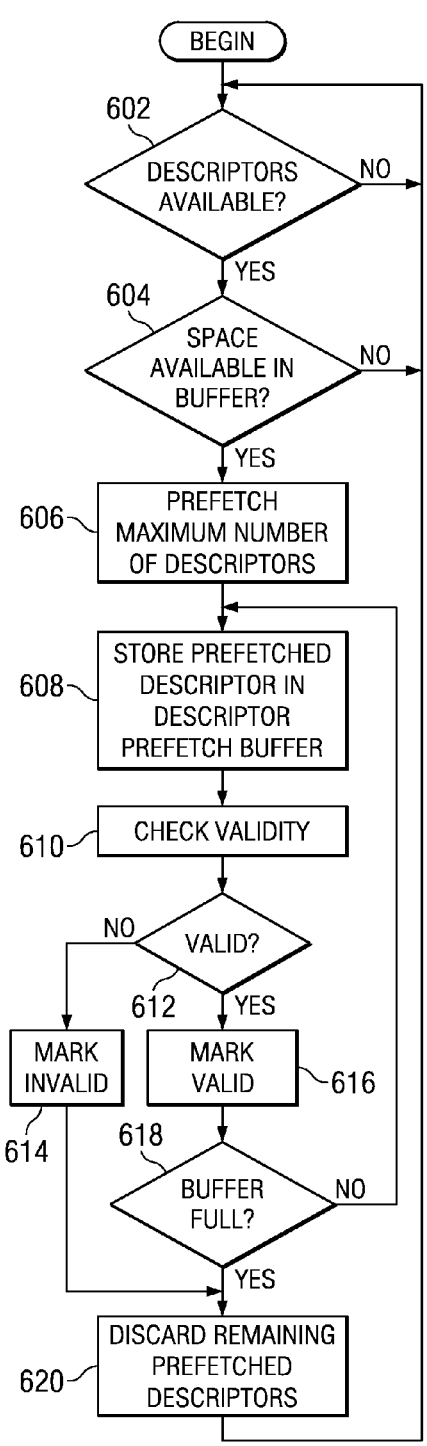

DESCRIPTOR PREFETCH MECHANISM FOR HIGH LATENCY AND OUT OF ORDER DMA DEVICE

BACKGROUND

1. Technical Field

The present application relates generally to an improved data processing system and method. More specifically, the present application is directed to a direct memory access controller with support for high latency devices.

2. Description of Related Art

Many system-on-a-chip (SOC) designs contain a device called a direct memory access (DMA) controller. The purpose of DMA is to efficiently move blocks of data from one location in memory to another. DMA controllers are usually used to move data between system memory and an input/output (I/O) device, but are also used to move data between one region in system memory and another. A DMA controller is called "direct" because a processor is not involved in moving the data.

Without a DMA controller, data blocks may be moved by having a processor copy data piece-by-piece from one memory space to another under software control. This usually is not preferable for large blocks of data. When a processor copies large blocks of data piece-by-piece, it is slow because the processor does not have large memory buffers and must move data in small inefficient sizes, such as 32-bits at a time. Also, while the processor is doing the copy, it is not free to do other work. Therefore, the processor is tied up until the move is completed. It is more efficient to offload these data block moves to a DMA controller, which can do them much faster and in parallel with other work.

DMA controllers usually have multiple "channels." As used herein, a "channel" is an independent stream of data to be moved by the DMA controller. Thus, DMA controllers may be programmed to perform several block moves on different channels simultaneously, allowing the DMA device to transfer data to or from several I/O devices at the same time.

Another feature that is typical of DMA controllers is a scatter/gather operation. A scatter/gather operation is one in which the DMA controller does not need to be programmed by the processor for each block of data to be moved from some source to some destination. Rather, the processor sets up a descriptor table or descriptor linked list in system memory. A descriptor table or linked list is a set of descriptors. Each descriptor describes a data block move, including source address, destination address, and number of bytes to transfer. Non-scatter/gather block moves, which are programmed via the DMA registers directly, are referred to as "single programming" DMA block moves.

A linked list architecture of a DMA controller is more flexible and dynamic than the table architecture. In the linked list architecture, the processor refers one of the DMA channels to the first descriptor in the chain, and each descriptor in the linked list contains a pointer to the next descriptor in memory. The descriptors may be anywhere in system memory, and the processor may add onto the list dynamically as the transfers occur. The DMA controller automatically traverses the table or list and executes the data block moves described by each descriptor until the end of the table or list is reached.

A DMA device may be architected to have an appropriate number of buffers and to handle an appropriate number of simultaneous outstanding transactions so that the high latency path to the data will not cause meaningful stalls in the data transfers. A typical DMA programming model is to chain data transfers together as a list of scatter/gather descriptors, as described above. These descriptors must be fetched from memory. If, in this environment, the latency to the descriptor memory is as high as the latency to the data, then a problem may be encountered. There may even be a problem with low latency descriptor fetches with high latency data block fetches, as will be discussed below.

A typical DMA architecture feeds the information fetched in a descriptor directly into the same configuration registers that are loaded by a "single programming" DMA block data move. The request of the next descriptor begins as soon as the DMA device starts the write of the final transaction for the current descriptor. The DMA device must wait until this final write begins, because at that time, the configuration registers that ran the data block move are available again to be loaded. This overlap can reduce, but not avoid, data bus stalls as the DMA device transitions from descriptor to descriptor in a low latency environment. However, this scheme may be a disaster in a high latency environment.

SUMMARY

The illustrative embodiments recognize the disadvantages of the prior art and provide a DMA device that prefetches descriptors into a descriptor prefetch buffer. The size of descriptor prefetch buffer holds an appropriate number of descriptors for a given latency environment. To support a linked list of descriptors, the DMA engine prefetches descriptors based on the assumption that they are sequential in memory and discards any descriptors that are found to violate this assumption. The DMA engine seeks to keep the descriptor prefetch buffer full by requesting multiple descriptors per transaction whenever possible. The bus engine fetches these descriptors from system memory and writes them to the prefetch buffer. The DMA engine may also use an aggressive prefetch where the bus engine requests the maximum number of descriptors that the buffer will support whenever there is any space in the descriptor prefetch buffer. The DMA device discards any remaining descriptors that cannot be stored.

In one illustrative embodiment, a method is provided for performing a direct memory access lock move with descriptor prefetch in a direct memory access device. The method comprises responsive to space being available in a descriptor prefetch buffer within the direct memory access device, fetching a plurality of direct memory access descriptors, stored sequentially in physical memory, into the descriptor prefetch buffer. The method further comprises processing descriptors from the descriptor prefetch buffer to perform direct memory access block moves according to the descriptors.

In one exemplary embodiment, the method further comprises checking validity of the plurality of direct memory access descriptors and responsive to a given direct memory access descriptor being non-sequential with respect to a previous direct memory access descriptor within the plurality of direct memory access descriptors, marking the given direct memory access descriptor invalid. In a further exemplary embodiment, the method further comprises marking each descriptor after the given direct memory access descriptor invalid.

In another exemplary embodiment, the method further comprises checking validity of the plurality of direct memory access descriptors and responsive to the given direct memory access descriptor being sequential with respect to a previous direct memory access descriptor within the plurality of direct memory access descriptors, marking the given direct memory access descriptor valid.

In a further exemplary embodiment, fetching a plurality of direct memory access descriptors comprises determining a number of available slots in the descriptor prefetch buffer and fetching a number of direct memory access descriptors corresponding to the number of available slots.

In a still further exemplary embodiment, fetching a plurality of direct memory access descriptors comprises fetching a number of direct memory access descriptors corresponding to a maximum number of slots in the descriptor prefetch buffer, attempting to store the fetched number of direct memory access descriptors in the descriptor prefetch buffer, and responsive to the descriptor prefetch buffer being full, discarding remaining direct memory access descriptors from the number of direct memory access descriptors that could not be stored in the descriptor prefetch buffer. In a still further exemplary embodiment, the method further comprises responsive to space being available in the descriptor prefetch buffer, storing a given direct memory access descriptor within the number of direct memory access descriptors in the descriptor prefetch buffer.

In yet another exemplary embodiment, the method further comprises checking validity of the given direct memory access descriptor and responsive to the given direct memory access descriptor being non-sequential with respect to a previous direct memory access descriptor within the number of direct memory access descriptors, marking the given direct memory access descriptor invalid. In a further exemplary embodiment, the method further comprises discarding each descriptor after the given direct memory access descriptor invalid. In another exemplary embodiment, the method further comprises checking validity of the given direct memory access descriptor and responsive to the given direct memory access descriptor being sequential with respect to a previous direct memory access descriptor within the number of direct memory access descriptors, marking the given direct memory access descriptor valid.

In another illustrative embodiment, a direct memory access device comprises a direct memory access engine having a prefetch buffer and a bus engine. Responsive to space being available in the descriptor prefetch buffer within the direct memory access device, the bus engine fetches a plurality of direct memory access descriptors, stored sequentially in a physical memory into the descriptor prefetch buffer. The direct memory access device processes direct memory access descriptors from the descriptor prefetch buffer to perform direct memory access block moves according to the direct memory access descriptors.

In one exemplary embodiment, the direct memory access engine checks validity of the plurality of direct memory access descriptors. Responsive to a given direct memory access descriptor being non-sequential with respect to a previous direct memory access descriptor within the plurality of direct memory access descriptors, the bus engine marks the given direct memory access descriptor invalid.

In another exemplary embodiment, the direct memory access engine marks each descriptor after the given direct memory access descriptor invalid. In a further exemplary embodiment, the direct memory access engine checks validity of the plurality of direct memory access descriptors and, responsive to the given direct memory access descriptor being sequential with respect to a previous direct memory access descriptor within the plurality of direct memory access descriptors, marks the given direct memory access descriptor valid.

In yet another exemplary embodiment, the bus engine determines a number of available slots in the descriptor prefetch buffer and fetches a number of direct memory access descriptors corresponding to the number of available slots. In a further exemplary embodiment, the bus engine fetches a number of direct memory access descriptors corresponding to a maximum number of slots in the descriptor prefetch buffer, attempts to store the fetched number of direct memory access descriptors in the descriptor prefetch buffer, and responsive to the descriptor prefetch buffer being full, discards remaining direct memory access descriptors from the number of direct memory access descriptors that could not be stored in the descriptor prefetch buffer.

In a further illustrative embodiment, a data processing system comprises a bus, a plurality of bus unit devices coupled to the bus, a direct memory access device coupled to the bus, wherein the direct memory access device comprises a descriptor prefetch buffer, a processing unit and a system memory coupled to the processing unit. The processing unit has access to the bus. The processing unit stores direct memory access descriptors in the system memory. Each direct memory access descriptor indicates a source device and a target device within the plurality of bus unit devices. Responsive to space being available in the descriptor prefetch buffer, the direct memory access device fetches a plurality of direct memory access descriptors from the system memory into the descriptor prefetch buffer. The direct memory access device processes direct memory access descriptors from the descriptor prefetch buffer to perform direct memory access block moves according to the direct memory access descriptors.

In one exemplary embodiment, the direct memory access device checks validity of the plurality of direct memory access descriptors. Responsive to a given direct memory access descriptor being non-sequential with respect to a previous direct memory access descriptor within the plurality of direct memory access descriptors, the direct memory access device marks the given direct memory access descriptor invalid.

In another exemplary embodiment, the direct memory access device determines a number of available slots in the descriptor prefetch buffer and fetches a number of direct memory access descriptors corresponding to the number of available slots.

In a further exemplary embodiment, the direct memory access device fetches a number of direct memory access descriptors corresponding to a maximum number of slots in the descriptor prefetch buffer, attempts to store the fetched number of direct memory access descriptors in the descriptor prefetch buffer, and responsive to the descriptor prefetch buffer being full, discards remaining direct memory access descriptors from the number of direct memory access descriptors that could not be stored in the descriptor prefetch buffer.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a block diagram illustrating a direct memory access device with descriptor prefetch buffer in accordance with an illustrative embodiment;

FIG. 5 is a flowchart illustrating the operation of a direct memory access device with descriptor prefetch in accordance with an illustrative embodiment; and FIG. 6 is a flowchart illustrating the operation of a direct memory access device with aggressive descriptor prefetch in accordance with an illustrative embodiment.

DETAILED DESCRIPTION OF THE
ILLUSTRATIVE EMBODIMENTS

Figure 1:
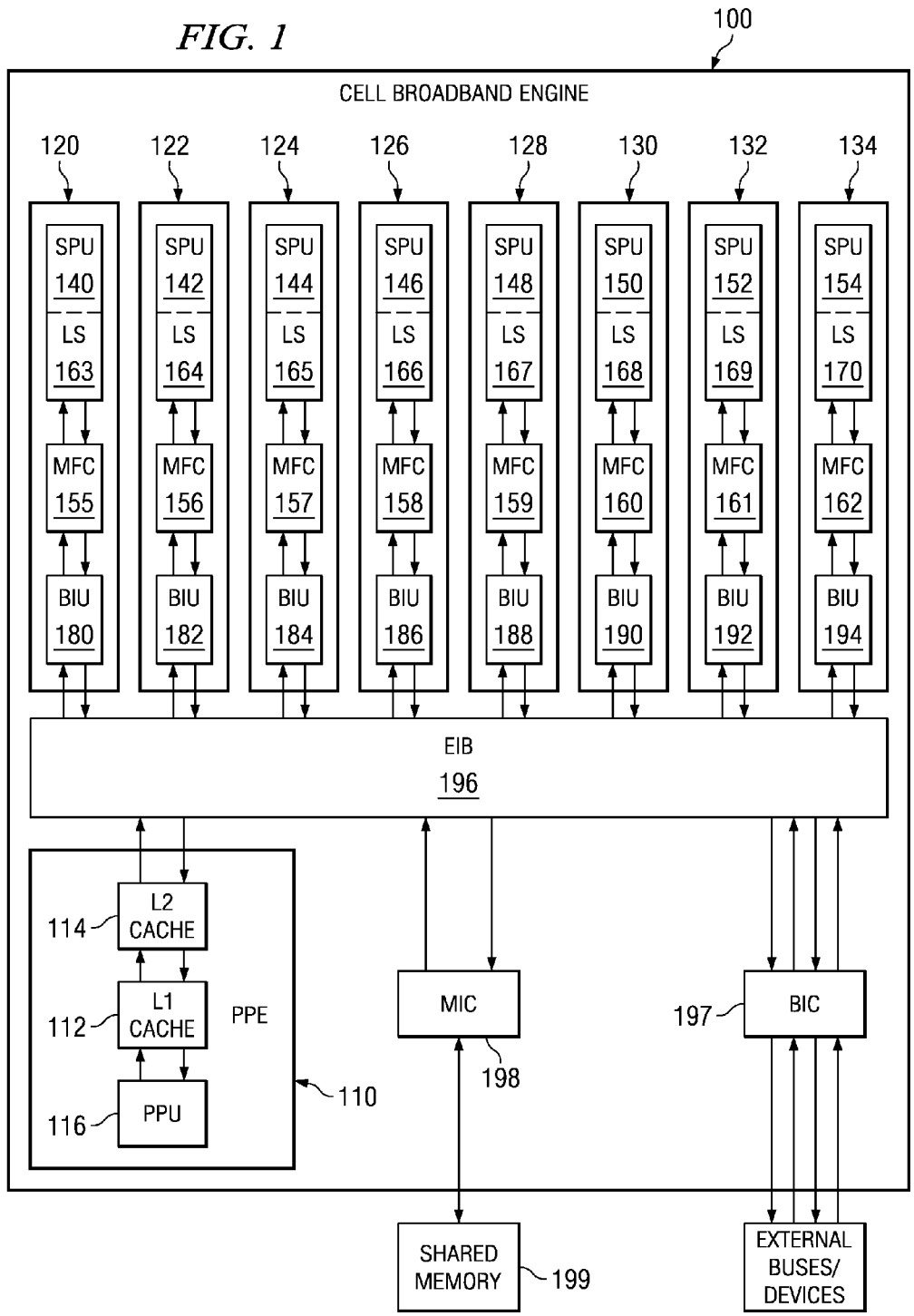
FIG. 1 is an exemplary block diagram of a data processing system in which aspects of the illustrative embodiments may be implemented.
Figure 2:
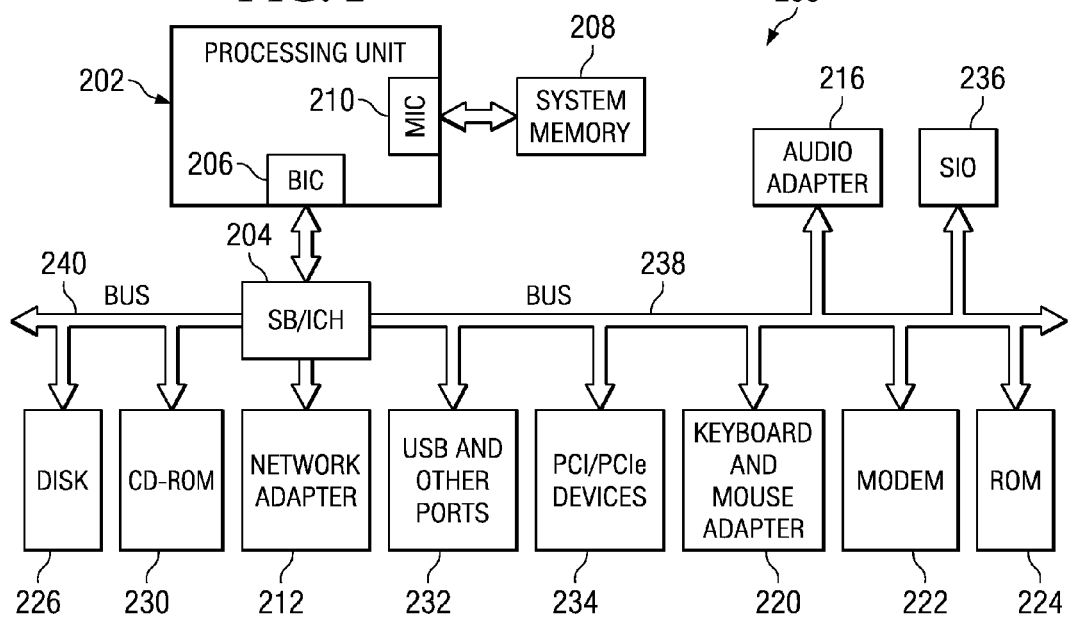
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is an exemplary block diagram of a data processing system in which aspects of the illustrative embodiments may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read-write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With reference now to FIG. 2, a block diagram of an exemplary data processing system is shown in which aspects of the illustrative embodiments may be implemented. In the depicted example, data processing system 200 employs a hub architecture including south bridge and input/output (I/O) controller hub (SB/ICH) 204. Processing unit 202 is connected to system memory 208 via memory interface controller (MIC) 210. Processing unit 202 is connected to SB/ICH 204 through bus interface controller (BIC) 206.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 202. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both, while LINUX is a trademark of Linus Torvalds in the United States, other countries, or both). Data processing system 200 may include a plurality of processors in processing unit 202. Alternatively, a single processor system may be employed.

Instructions for the operating system, the object oriented programming system, and applications or programs are located on storage devices, such as HDD 226, and may be loaded into main memory 208 for execution by processing unit 202. The processes for illustrative embodiments of the present invention may be performed by processing unit 202 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), video game console, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

South bridge 204 may include a direct memory access (DMA) controller. DMA controllers are usually used to move data between system memory and an input/output (I/O) device, but are also used to move data between one region in system memory and another. High latency devices present unique challenges if high bus utilization is desired. When talking to a high latency device, there must be enough simultaneous transactions outstanding so that the time it takes to receive data from the high latency device is less than or equal to the amount of time it takes to transfer the data from all of the other outstanding transactions queued ahead of it. If this criterion is met, then there seldom will be gaps or stalls on the bus where the DMA is waiting for data and does not have any other data available to transfer.

With trends towards further integration, particularly with systems-on-a-chip, many devices in FIG. 2 may be integrated within south bridge 204. For example, a single bus may be integrated within south bridge 204. Also, controllers and interfaces, such as USB controller, PCI and PCIe controllers, memory controllers, and the like, may be integrated within south bridge 204 and attached to the internal bus. Furthermore, south bridge 204 may include a memory controller to which a memory module may be connected for local memory. Also note that processing unit 202 may include an internal bus, such as EIB 196 in FIG. 1, through which the DMA device may access system memory 208.

Figure 3:
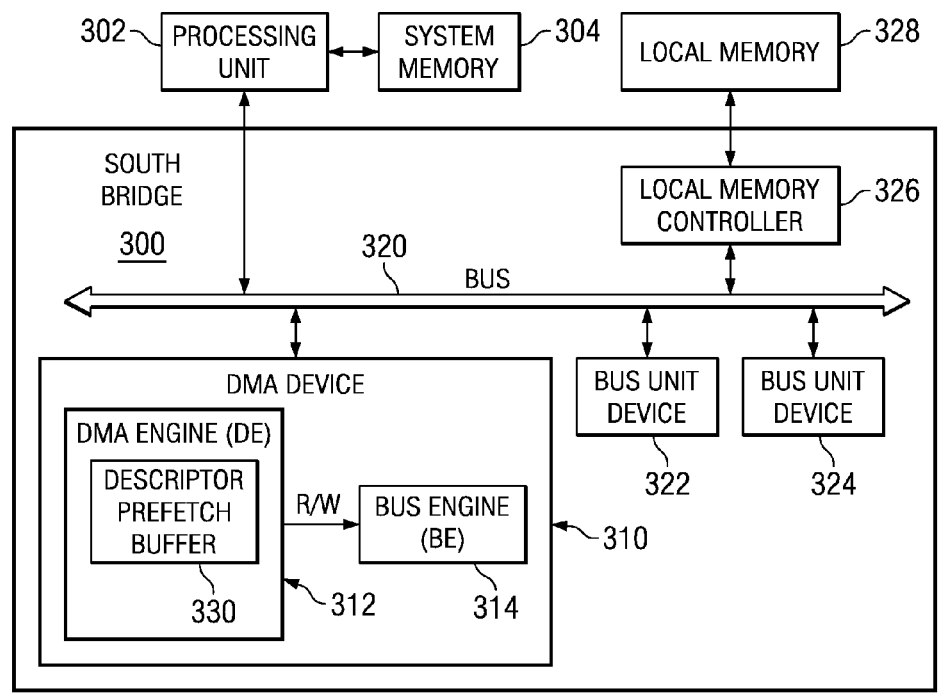
FIG. 3 is a block diagram illustrating a south bridge in accordance with an illustrative embodiment.

FIG. 3 is a block diagram illustrating a south bridge in accordance with an illustrative embodiment. Processing unit 302, for example, issues DMA commands to bus 320 in south bridge 300. DMA device 310 within south bridge 300 may then execute the DMA commands by performing read operations from source devices, such as bus unit device 322, and write operations to target devices, such as bus unit device 324. In an alternative example, a DMA command may request to move a block of data from bus unit device 322 to system memory 304, or according to yet another example, a DMA command may request to move a block of data from memory 304 to bus unit device 324. Bus unit device 322 and bus unit device 324 may be, for example, memory controllers, USB controllers, PCI controllers, storage device controllers, and the like, or combinations thereof.

The source devices and target devices may include low latency devices, such as memory, and high latency devices, such as hard disk drives. Note, however, that devices that are generally low latency, such as memory devices, may also be high latency in some instances, depending on their location in the bus and bridge hierarchy. Many of the components of south bridge 300 are not shown for simplicity. A person of ordinary skill in the art will recognize that south bridge 300 will include many more features and functions not illustrated in FIG. 3.

In south bridge 300, DMA device 310 comprises DMA engine (DE) 312 and bus engine (BE) 314. A specialized read-write (RW) command allows DE 312 to more efficiently queue transactions to BE 314. Using a more standard implementation, the DE would micromanage the BE by specifying every transaction that the BE is to execute on the bus. However, in the illustrative embodiment, the specialized RW command allows DE 312 to specify both a read and a write at the same time so that DE 312 can more efficiently control the moving of data blocks.

BE 314 may read the DMA commands, such as block move requests, issued from processing unit 302 to bus 320. Processing unit 302 may issue DMA commands directly to DMA device 310. Alternatively, processing unit 302 may issue DMA commands using a scatter/gather list, which may be a table or linked list in system memory 304 or in local memory 328. In the latter case, BE 314 may simply read a descriptor from the scatter/gather list to receive the next DMA command. DMA device 310 may use local memory 328, connected through local memory controller 326, as a working memory.

In accordance with an illustrative embodiment, as illustrated in FIG. 3, for example, a DMA device is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The BE must support enough simultaneous transactions, and, thus, enough buffers, to keep the pipeline of data flow from stalling. The DE queues transactions to the BE and can get far ahead of the BE per the BE's buffer space. The BE throttles the DE via simple request/acknowledge handshaking.

The DE does not know, or need to know, how many buffers the BE has implemented; therefore, different BEs can be used with the same DE to support different latency environments or to attach to different busses. For maximum scalability, the BE may be constructed as logically independent "BE units," each responsible for managing one buffer and one transaction for the DE. The number of BE units may be a configurable synthesis parameter.

As long as the DE gets an acknowledge for its current request, it can make another request. When the BE is out of available buffers, it withholds the acknowledge of the DE's current request, which prevents the DE from requesting any more transactions. When resources free up in the BE, it will activate the acknowledge to the DE, and then the DE can request another transaction.

The BE contains a general pool of buffers. For example, if the BE contains 16 buffers, all 16 may be used by one DMA channel, or they may be allocated any way the DE needs them between the channels. The DE queues transactions from any of the channels to the BE. The DE only stops queuing transactions when it has no more work to do or when the BE withholds the acknowledge indicating that it is out of available buffer space.

The BE runs all the queued transactions according to the bus protocol and handles possible bus situations, such as transaction data coming back out of order and retried transactions. A DMA that handles out of order data is optimized for data block moves for which there is no meaning to the order of the sub-blocks. There are some applications like networking and video stream transport where the data must be moved in order.

There may be a simple interface between the DE and the BE in which the DE queues transactions to the BE. The BE runs the transactions for the DE until the DE has caused all programmed data blocks to be moved. A DE may cause all of the data blocks to be moved by specifying each read and each write to the BE, which performs those reads and writes on the bus. The DE arbitrates among the channels and usually interleaves reads and writes from the various channels in a fair way so that data from all of the channels can transfer more or less simultaneously. There are various channel arbitration priority schemes that can be implemented; however, arbitration is not a focus of this disclosure.

Because a DMA involves moving data, each read transaction that the DE performs from the source address must eventually be followed by a corresponding write transaction to a destination address. And because the DMA moves data rather than processing data, the data that was transferred by the read transaction is the same data that is transferred by the corresponding write transaction. The data is not modified in any way. Therefore, in accordance with an illustrative embodiment, the DE and BE may make the process more efficient by using a combined read-write (RW) command that can be queued between the DE and the BE.

In one illustrative embodiment, the DMA device prefetches descriptors into a descriptor prefetch buffer. In the example depicted in FIG. 3, descriptor prefetch buffer 330 is located in DE 312. The size of descriptor prefetch buffer 330 holds an appropriate number of descriptors for a given latency environment. DE 312 seeks to keep descriptor prefetch buffer 330 full by requesting multiple descriptors per transaction whenever possible. BE 314 fetches these descriptors from system memory 304 or from local memory 328 and sends them directly the to DE 312 via a special data path on the R/W interface that is used only for passing descriptors from BE 314 to descriptor prefetch buffers in DE 312. In the depicted example, DE 312 may continuously queue data transactions to BE 314 without having to stall as it transitions from descriptor to descriptor, because the next descriptor will likely be in the prefetch buffer.

In the descriptor table architecture, descriptors are sequential, and prefetching descriptors is straightforward. However, the descriptor table architecture has disadvantages that DMA controllers typically attempt to avoid by using a more flexible linked list architecture. Prefetching descriptors is inherently a serial process, because each descriptor points to the next one in a linked list. In theory, the DMA controller will not know where to get the next descriptor until the current descriptor is retrieved and examined, because each descriptor "points" to the location of the next descriptor.

In accordance with an illustrative embodiment, the DMA controller makes an assumption that descriptors are stored sequentially in memory and "speculatively" fetches them according to that assumption. When DE 312 receives the actual descriptor data from system memory, it checks each descriptor to make sure that the assumption was valid. When the assumption is found to not be valid, the prefetch buffer is flushed and a new fetch is issued to the correct address. Thus, there should only be stalls under this scheme at times when the descriptors could not be stored sequentially in memory. This should be rare with correctly written software. This approach gives a large a performance gain without having to use the less flexible "descriptor table" architecture.

FIG. 4 is a block diagram illustrating a direct memory access device with descriptor prefetch buffer in accordance with an illustrative embodiment. DMA device 400 may execute the DMA commands by performing read operations from source devices and write operations to target devices. Many of the components of DMA device 400 are not shown for simplicity. A person of ordinary skill in the art will recognize that DMA device 400 may include many more features and functions not illustrated in FIG. 4. DMA device 400 comprises DMA engine (DE) 412 and bus engine (BE) 414. BE 414 may read the DMA commands, as defined by descriptors 431-435, for example, from system memory 430. Descriptors 431-435 comprise a scatter/gather list, which may be a linked list in system memory 430.

In accordance with an illustrative embodiment, as illustrated in FIG. 4, for example, BE 414 prefetches a predetermined number of descriptors into descriptor prefetch buffer 450 via bus 420. In one exemplary embodiment, there may be a descriptor prefetch buffer for each DMA channel since each channel follows a different linked list of descriptors; however, only one descriptor prefetch buffer is shown for simplicity in FIG. 4. In the depicted example, descriptor prefetch buffer 450 holds four descriptors 451-454. Descriptor prefetch buffer 450 may hold more or fewer descriptors depending upon the implementation and, more particularly, the latency environment of DMA device 400.

Each descriptor may be 64 bytes long, for instance. When a scatter/gather operation is started by software on a channel, DE 412 immediately sends out a request for four sequential descriptors in a single 256-byte transaction, in this example. Be 414 performs the transaction. BE 414 stores descriptors 451-454 into descriptor prefetch buffer 450 as it is received.

As the data is placed into descriptor prefetch buffer 450, DMA device 400 evaluates the data on the fly to determine whether each descriptor is in fact sequential to the previous descriptor, or even a descriptor at all. Descriptors 451-454 are stored in buffer 450 and include a valid/invalid flag 456. Each sequential descriptor is marked as valid using valid/invalid flag 456. If a descriptor is found to be non-sequential or otherwise invalid, then DMA device 400 marks that descriptor and all following descriptors as invalid using flag 456. DE 412 performs the validation of descriptors as they are passed to it by BE 414.

If a descriptor is marked as invalid using flag 456, then the slot in descriptor prefetch buffer 450 is considered to be empty. Therefore, if any descriptors are marked as invalid, then buffer 450 is not actually full, and BE 414 may immediately perform another descriptor fetch based on the amount of available space in the buffer.

As an example, consider a buffer that is able to hold four descriptors. Initially, the BE fetches four descriptors into the buffer. In this example, consider the first and second descriptors to be valid, but the third descriptor is found to be non-sequential. The DMA device marks the first and second descriptors as valid and marks the third and fourth descriptors as invalid. As soon as the third descriptor is found to be invalid, the DE requests two more descriptors, because there are two available slots in the descriptor prefetch buffer.

The rule for fetching descriptors is that whenever there is space available in the prefetch buffer, either due to processing a valid descriptor or finding prefetched descriptors to be invalid when they arrive, the DE queues a single transaction that requests the amount of descriptors needed to fill the available space in the buffer. Therefore, the DE can request one, two, three, or four descriptors in one transaction, according to the above example, depending upon how much space is currently available in the buffer.

During typical operation, the DE will request four descriptors to start a channel and then request one descriptor each time it completes the processing of a descriptor. The DE will not need the data for that next descriptor until it completely processes the other three descriptors in the buffer. This mechanism should allow descriptors to be fetched enough ahead of time to avoid stalls for reasonably sized packets. Of course, it the packet size that each descriptor points to is smaller than a critical size, then there will be stalls. The number of prefetch entries must be sized according to the maximum data fetch latency, the maximum descriptor fetch latency, and the minimum packet size that each descriptor can describe.

In order for a DMA controller with the descriptor prefetch buffer described above to perform well, software must build descriptor linked lists sequentially in memory whenever possible. Each non-sequential descriptor will cause the DMA engine to throw away data that it has prefetched and go back and start a descriptor fetch to a new address, thus causing a stall. Sometimes, software can only control the sequential nature of the descriptor linked list to a certain point. Software may make the descriptors sequential in virtual memory, for example, but the operating system may map the corresponding real pages non-sequentially in physical memory. Since pages are typically at least 4 k, there may be at least 64 sequential (64-byte) descriptors before there is a possibility of a non-sequential descriptor, due to a non-sequential page. These "jumps" due to page boundaries should have a negligible impact on the performance of a DMA device using the descriptor prefetch buffer described above.

It is important to note, however, that having sequential descriptors is not necessary for the correct operation of the DMA device. Correct results will be obtained even if none of the descriptors are sequential. Building the descriptor linked list sequentially in memory only impacts performance, not function.

FIG. 5 is a flowchart illustrating the operation of a direct memory access device with descriptor prefetch in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 5, operation begins and the DMA device determines whether descriptors are available in a scatter/gather linked list in system memory (block 502). If descriptors are not available, operation returns to block 502 to wait until descriptors are available. If descriptors are available in block 502, the DMA device determines whether space is available in the descriptor prefetch buffer (block 504). If space is not available, then operation returns to block 502 to wait until descriptors are available.

If space is available in the prefetch buffer in block 504, then the DMA device determines the number of available descriptor slots in the descriptor prefetch buffer (block 506). Then, the bus engine fetches the descriptors into the descriptor prefetch buffer (block 508).

Next, the DMA device checks the validity of a prefetched descriptor (block 510) and determines whether the descriptor is valid (block 512). A descriptor may be invalid, for example, if it is not a sequential descriptor pointed to by a previous descriptor in the butter. If the descriptor is invalid, the DMA device marks the descriptor and all subsequent descriptors as invalid using a valid/invalid flag (block 514) and then operation returns to block 502 to wait until descriptors are available; otherwise, the DMA device marks the descriptor as valid (block 516).

Thereafter, the DMA device determines whether the descriptor is the last descriptor that was fetched (block 518). If the descriptor is not the last prefetched descriptor, operation returns to block 510 where the DMA device checks the validity of the next prefetched descriptor. If the descriptor is the last prefetched descriptor in block 518, operation returns to block 502 to wait for more descriptors to be available.

The above described DMA prefetch mechanism works well down to a certain data packet size, but may experience stalls for lower packet sizes. In another illustrative embodiment, the DMA device uses an aggressive prefetch. The aggressive prefetch uses more bus bandwidth, because it ends up having to throw away more descriptors, so it would only be used when smaller packets must be supported than the above described descriptor prefetch mechanism can handle.

The problem experienced with small packet sizes is that the DE starts queuing the transactions to the BE, and the prefetch buffer starts emptying quickly. As soon as the prefetch buffer starts to empty, the DE makes a prefetch request. Depending on how things line up, there are usually two descriptors processed by the BE and two descriptors remaining in the prefetch buffer when the DE is ready to make its next descriptor prefetch. This causes the DE to request two more descriptors. Then, a few clock cycles later, the DE is done queuing the rest of the transactions for the final two descriptors to the BE, and the prefetch buffer is empty. Therefore, the DE requested two descriptors when it really could have requested four if it had waited a few more clock cycles. This causes stalls, because the DE can only support one pending descriptor fetch at a time as there are many significant difficulties with supporting more than one, such as having to support out of order prefetch return.

The two descriptors come back and the DE processes them quickly. Thus, the DE requests four more descriptors. When four descriptors come back, the same thing happens and the DE requests two more descriptors in the next fetch. As a result, the DE repeats a pattern of four, two, four, two, etc. This causes stalls in performance.

In accordance with an illustrative embodiment, the DE requests the maximum number of descriptors whenever there is any space in the descriptor prefetch buffer. This is very aggressive, because the DE will often request more descriptor data than the buffer can store. Descriptors that arrive for which there is no buffer space available are discarded. However, this aggressive prefetch works, because in a high latency read environment, by the time the buffer receives the descriptors, the DMA device is likely to have processed some more descriptors. Therefore, some extra data, that would otherwise have not been anticipated, can be used. The extra bandwidth taken by reading some descriptor data that cannot be stored is greatly outweighed by the performance gained by receiving descriptors early that can be used without waiting for a subsequent request.

When packet sizes are larger, then the DMA device ends up throwing away more descriptors, because there is no room in the buffer to store them. However, when packet sizes are larger, there is no danger of stalling the pipeline due to a lack of descriptors, so the additional bandwidth used by the discarded descriptors is negligible.

FIG. 6 is a flowchart illustrating the operation of a direct memory access device with aggressive descriptor prefetch in accordance with an illustrative embodiment. Operation begins and the DMA device determines whether descriptors are available in a scatter/gather linked list in system memory (block 602). If descriptors are not available, operation returns to block 602 to wait until descriptors are available. If descriptors are available in block 602, the DMA device determines whether space is available in the descriptor prefetch butter (block 604). If space is not available, then operation returns to block 602 to wait until descriptors are available.

If space is available in the prefetch buffer in block 604, then the bus engine fetches a maximum number of descriptors that the descriptor prefetch buffer will hold (block 606). Then, the BE stores a prefetched descriptor into the descriptor prefetch buffer (block 608). Next, the DMA device checks the validity of the stored prefetched descriptor (block 610) and determines whether the descriptor is valid (block 612). A descriptor may be invalid, for example, if it is not a sequential descriptor pointed to by a previous descriptor in the buffer. If the descriptor is invalid, the DMA device marks the descriptor as invalid using a valid/invalid flag (block 614) and discards the remaining prefetched descriptors (block 620), and operation returns to block 602 to wait for more descriptors to be available; otherwise, the DMA device marks the descriptor as valid (block 616).

Thereafter, the DMA device determines whether the prefetch buffer has room to store the descriptor (block 618). If the buffer is not full, operation returns to block 608 where the DMA device stores a next prefetched descriptor. If the buffer is full in block 618, the DMA device discards the remaining prefetched descriptors (block 620), and operation returns to block 602 to wait for more descriptors to be available.

Thus, the illustrative embodiments solve the disadvantages of the prior art by providing a DMA device that is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The DE and BE may make the process more efficient by using a combined read-write (RW) command that can be queued between the DE and the BE.

The DMA device prefetches descriptors into a descriptor prefetch buffer. The size of descriptor prefetch buffer holds an appropriate number of descriptors for a given latency environment. To support a linked list of descriptors, the DMA engine prefetches descriptors based on the assumption that they are sequential in memory and discards any descriptors that are found to violate this assumption. The DMA engine seeks to keep the descriptor prefetch buffer full by requesting multiple descriptors per transaction whenever possible. The bus engine fetches these descriptors from system memory and writes them to the prefetch buffer. The DMA engine may also use an aggressive prefetch where the bus engine requests the maximum number of descriptors that the buffer will support whenever there is any space in the descriptor prefetch buffer. The DMA device discards any remaining descriptors that cannot be stored.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing a direct memory access block move with descriptor prefetch in a direct memory access device, the method comprising:
   responsive to space being available in a descriptor prefetch buffer within the direct memory access device, fetching, using one read/write transaction, a block of sequential physical memory into the descriptor prefetch buffer to speculatively prefetch a plurality of direct memory access descriptors, stored in a linked list architecture;
   checking validity of the speculatively prefetched plurality of direct memory access descriptors in the descriptor prefetch buffer;
   responsive to a given direct memory access descriptor being non-sequential with respect to a previous direct memory access descriptor within the speculatively prefetched plurality of direct memory access descriptors or being an invalid direct memory access descriptor, marking the given direct memory access descriptor invalid; and
   processing descriptors from the descriptor prefetch buffer to perform direct memory access block moves according to the descriptors.

2. The method of claim 1, further comprising: marking each descriptor after the given direct memory access descriptor invalid.

3. The method of claim 1, further comprising:
   responsive to the given direct memory access descriptor being sequential with respect to a previous direct memory access descriptor within the plurality of direct memory access descriptors and being a valid direct memory access descriptor, marking the given direct memory access descriptor valid.

4. A method for performing a direct memory access block move with descriptor prefetch in a direct memory access device, the method comprising:
   responsive to space being available in a descriptor prefetch buffer within the direct memory access device, fetching, using one read/write transaction, a block of sequential physical memory into the descriptor prefetch buffer to speculatively prefetch a plurality of direct memory access descriptors, stored in a linked list architecture; and
   processing descriptors from the descriptor prefetch buffer to perform direct memory access block moves according to the descriptors,
   wherein speculatively prefetching a plurality of direct memory access descriptors comprises:
   determining a number of available slots in the descriptor prefetch buffer; and
   fetching the block of sequential physical memory, using one read/write transaction, having a number of speculatively prefetched direct memory access descriptors corresponding to the number of available slots;
   checking validity of the plurality of speculatively prefetched direct memory access descriptors in the descriptor prefetch buffer; and
   responsive to a given direct memory access descriptor being non-sequential with respect to a previous direct memory access descriptor within the plurality of speculatively prefetched direct memory access descriptors or being an invalid direct memory access descriptor, marking the given direct memory access descriptor invalid.

5. A method for performing a direct memory access block move with descriptor prefetch in a direct memory access device, the method comprising:
   responsive to space being available in a descriptor prefetch buffer within the direct memory access device, fetching, using one read/write transaction, a block of sequential physical memory into the descriptor prefetch buffer to speculatively prefetch a plurality of direct memory access descriptors, stored in a linked list architecture; and
   processing descriptors from the descriptor prefetch buffer to perform direct memory access block moves according to the descriptors,
   wherein speculatively prefetching a plurality of direct memory access descriptors comprises:
   fetching the block of sequential physical memory, using one read/write transaction, having a number of speculatively prefetched direct memory access descriptors corresponding to a maximum number of slots in the descriptor prefetch buffer;
   attempting to store the number of speculatively prefetched direct memory access descriptors in the descriptor prefetch buffer; and
   responsive to the descriptor prefetch buffer being full, discarding remaining direct memory access descriptors from the number of speculatively prefetched direct memory access descriptors that could not be stored in the descriptor prefetch buffer.

6. The method of claim 5, further comprising:

responsive to space being available in the descriptor prefetch buffer, storing a given direct memory access descriptor within the number of direct memory access descriptors in the descriptor prefetch buffer.

7. The method of claim 6, further comprising:

checking validity of the given direct memory access descriptor; and responsive to the given direct memory access descriptor being non-sequential with respect to a previous direct memory access descriptor within the number of direct memory access descriptors or being an invalid direct memory access descriptor, marking the given direct memory access descriptor invalid.

8. The method of claim 7, further comprising:

discarding each descriptor after the given direct memory access descriptor invalid.

9. The method of claim 6, further comprising:

checking validity of the given direct memory access descriptor; and responsive to the given direct memory access descriptor being sequential with respect to a previous direct memory access descriptor within the number of direct memory access descriptors and being a valid direct memory access descriptor, marking the given direct memory access descriptor valid.

10. The method of claim 4, further comprising:

marking each descriptor after the given direct memory access descriptor invalid.

11. The method of claim 4, further comprising:

responsive to the given direct memory access descriptor being sequential with respect to a previous direct memory access descriptor within the plurality of direct memory access descriptors and being a valid direct memory access descriptor, marking the given direct memory access descriptor valid.

* * * * *